US012661769B2

(12) United States Patent
Braun

(10) Patent No.: US 12,661,769 B2
(45) Date of Patent: Jun. 23, 2026

(54) HAND-HELD POWER TOOL WITH A MECHANICAL PERCUSSION MECHANISM

(71) Applicant: Robert Bosch GmbH, Stuttgart (DE)

(72) Inventor: Willy Braun, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/693,660

(22) PCT Filed: Aug. 5, 2022

(86) PCT No.: PCT/EP2022/072118
§ 371 (c)(1),
(2) Date: Mar. 20, 2024

(87) PCT Pub. No.: WO2023/057115
PCT Pub. Date: Apr. 13, 2023

(65) Prior Publication Data

US 2024/0391078 A1 Nov. 28, 2024

(30) Foreign Application Priority Data

Oct. 4, 2021 (DE) ..................... 10 2021 211 163.7

(51) Int. Cl.
*B25D 16/00* (2006.01)
*B25D 17/06* (2006.01)

(52) U.S. Cl.
CPC ........... *B25D 16/006* (2013.01); *B25D 17/06* (2013.01)

(58) Field of Classification Search
CPC .................. B25D 16/006; B25D 17/06; B25D 2211/003; B25D 11/12
See application file for complete search history.

(56) References Cited

U.S. PATENT DOCUMENTS 1,298,966 A * 4/1919 Knowlson ............ B25D 11/125 318/4
1,803,307 A * 4/1931 Wodack ................. B25D 17/00 175/212

(Continued)

FOREIGN PATENT DOCUMENTS

DE 1427747 A1 11/1969
DE 102006059076 A1 6/2008

(Continued)

OTHER PUBLICATIONS

International Search Report corresponding to PCT Application No. PCT/EP2022/072118, mailed Dec. 5, 2022. (German and English language document). (5 pages).

*Primary Examiner* — David G Shutty
(74) *Attorney, Agent, or Firm* — Maginot, Moore & Beck LLP

(57) ABSTRACT

A hand-held power tool has a housing in which a drive motor for driving a percussion mechanism is arranged. The percussion mechanism has a percussion piston arranged in a hammer tube for displacement along an associated percussion axis, via a connecting rod. The percussion mechanism is assigned an eccentric for driving the connecting rod in rotation. A reduction-gear mechanism driven by the drive motor has a first spur gear arranged along the percussion axis between the drive motor and the eccentric. The eccentric is arranged on a second spur gear. The first spur gear meshes with teeth of the second spur gear. At least some of the teeth of the second spur gear are positioned perpendicularly to the percussion axis, between the percussion axis and a plane arranged parallel to the percussion axis. A bearing element of the eccentric arranged towards the percussion axis is arranged in the plane.

12 Claims, 3 Drawing Sheets

(56) References Cited

U.S. PATENT DOCUMENTS

| | | | | | |
|---|---|---|---|---|---|
| 2,533,487 | A * | 12/1950 | Maurer | F02B 75/16 | 123/179.29 |
| 2,677,355 | A * | 5/1954 | Maurer | F02B 75/16 | 123/197.1 |
| 3,114,421 | A * | 12/1963 | Mccloud | B25D 16/00 | 173/127 |
| 3,114,423 | A * | 12/1963 | Naslund | B25D 17/005 | 279/19.3 |
| 3,456,740 | A * | 7/1969 | Bronnert | B25D 11/125 | 173/121 |
| 3,685,594 | A * | 8/1972 | Koehler | B25D 11/108 | 173/205 |
| 3,718,193 | A * | 2/1973 | Wanner | B25D 11/125 | 173/117 |
| 3,774,699 | A * | 11/1973 | Schmuck | B25D 16/006 | 173/48 |
| 3,828,863 | A * | 8/1974 | Bleicher | B25D 16/006 | 173/48 |
| 3,874,460 | A * | 4/1975 | Schmid | B25D 16/006 | 173/117 |
| 4,349,074 | A | 9/1982 | Ince | | |
| 4,529,044 | A * | 7/1985 | Klueber | B25D 16/00 | 408/9 |
| 4,609,053 | A * | 9/1986 | Ragnmark | B25D 17/24 | 173/104 |
| 6,073,705 | A * | 6/2000 | Shibata | B25D 17/088 | 279/19.5 |
| 6,732,815 | B2 * | 5/2004 | Hanke | B25D 17/20 | 173/210 |
| 6,843,327 | B2 * | 1/2005 | Meixner | B25D 11/125 | 173/176 |
| 6,948,571 | B2 * | 9/2005 | Hanke | B25D 11/062 | 173/210 |
| 7,096,973 | B2 * | 8/2006 | Ikuta | B25D 17/24 | 173/162.1 |
| 7,325,624 | B2 * | 2/2008 | Yamazaki | B25D 11/005 | 173/48 |
| 7,401,661 | B2 * | 7/2008 | Berghauser | B25D 17/24 | 173/76 |
| 7,640,997 | B2 * | 1/2010 | Bram | B25D 17/043 | 173/162.2 |
| 7,819,203 | B2 * | 10/2010 | Sato | B25D 17/11 | 279/19 |
| 8,096,369 | B2 * | 1/2012 | Meixner | B25D 17/06 | 173/90 |
| 8,613,328 | B2 * | 12/2013 | Meixner | B25D 11/125 | 173/205 |
| 9,802,306 | B2 * | 10/2017 | Miwa | B25D 17/24 | |
| 9,937,612 | B2 * | 4/2018 | Bito | B25D 11/04 | |
| 10,022,852 | B2 * | 7/2018 | Ikuta | B25D 17/24 | |
| 10,850,381 | B2 * | 12/2020 | Ikuta | B25D 11/06 | |
| 10,926,393 | B2 * | 2/2021 | Zawisza | B25F 5/02 | |
| 11,059,155 | B2 * | 7/2021 | Zawisza | B25F 5/00 | |
| 11,845,168 | B2 * | 12/2023 | Tsuji | B25D 11/12 | |
| 11,865,687 | B2 * | 1/2024 | Zawisza | B25F 5/02 | |
| 2008/0149359 | A1 * | 6/2008 | Meixner | B25D 17/00 | 173/128 |
| 2010/0012337 | A1 * | 1/2010 | Meixner | B25D 11/125 | 173/114 |
| 2021/0268636 | A1 * | 9/2021 | Braun | B25F 5/006 | |
| 2024/0391078 | A1 * | 11/2024 | Braun | B25D 11/12 | |

FOREIGN PATENT DOCUMENTS

| | | | | |
|---|---|---|---|---|
| DE | 102018210553 | A1 * | 1/2020 | B25F 5/00 |
| JP | 2015089593 | A * | 5/2015 | B25D 17/043 |
| WO | 2008/071489 | A1 | 6/2008 | |
| WO | 2015068740 | A1 | 5/2015 | |

* cited by examiner

HAND-HELD POWER TOOL WITH A MECHANICAL PERCUSSION MECHANISM

This application is a 35 U.S.C. § 371 National Stage Application of PCT/EP2022/072118, filed on Aug. 5, 2022, which claims the benefit of priority to Serial No. DE 10 2021 211 163.7, filed on Oct. 4, 2021 in Germany, the disclosures of which are incorporated herein by reference in their entirety.

BACKGROUND

The present disclosure relates to a hand-held power tool having a housing, in which a drive motor for driving a mechanical percussion mechanism is arranged, wherein the percussion mechanism has a percussion piston which can be driven in a linear oscillating manner, which is arranged in a hammer tube arranged at least in sections in the housing, such that it can be displaced along an associated percussion axis via a connecting rod, and wherein the percussion mechanism is assigned an eccentric for driving the connecting rod in rotation.

Such a hand-held power tool is known from the prior art. This hand-held power tool has a housing in which a drive motor for driving a mechanical percussion mechanism is arranged. The percussion mechanism comprises a percussion piston which can be driven in a linearly oscillating manner, which is arranged in a hammer tube arranged at least in sections in the housing, such that it can be displaced along an associated percussion axis via a connecting rod. Furthermore, the percussion mechanism is assigned an eccentric for driving the connecting rod in rotation.

SUMMARY

The disclosure relates to a hand-held power tool having a housing, in which a drive motor for driving a mechanical percussion mechanism is arranged, wherein the percussion mechanism has a percussion piston which can be driven in a linear oscillating manner, which is arranged in a hammer tube arranged at least in sections in the housing, such that it can be displaced along an associated percussion axis via a connecting rod, and wherein the percussion mechanism is assigned an eccentric for driving the connecting rod in rotation. A reduction-gear mechanism, which can be driven by the drive motor and has a first spur gear, is arranged along the percussion axis, between the drive motor and the eccentric, wherein the eccentric is arranged on a second spur gear with teeth, wherein the first spur gear meshes with the teeth of the second spur gear, and wherein at least some of the teeth of the second spur gear are positioned perpendicularly to the percussion axis, between the percussion axis and a plane arranged parallel to the percussion axis, wherein a bearing element of the eccentric arranged towards the percussion axis is arranged in the plane.

The disclosure thus enables the provision of a hand-held power tool in which a simple and compact eccentric, gear, and motor arrangement can be enabled by the arrangement of the reduction-gear mechanism.

Preferably, the eccentric and the second spur gear are integrally formed.

Thus, a compact eccentric having the second spur gear can be easily and straightforwardly provided, wherein both parts can be fabricated in a single operation.

Preferably, the reduction-gear mechanism comprises two spur gears, wherein the two spur gears are connected to one another or are integrally formed.

Thus, an appropriate reduction-gear mechanism may be provided in a simple manner.

The first spur gear is preferably positioned perpendicular to the percussion axis between the percussion axis and a plane arranged parallel to the percussion axis, wherein a bearing element on the output side of a motor shaft of the drive motor is arranged in the plane.

Thus, an arrangement of the first spur gear perpendicular to the percussion axis can be made relatively close to the percussion axis in an easy and straightforward manner.

According to one embodiment, the percussion mechanism is assigned a trough-shaped percussion mechanism housing having a bottom portion, wherein the bottom portion comprises a first and second bearing point for mounting the eccentric, a third bearing point for mounting the reduction-gear mechanism, and a fourth bearing point for mounting a motor shaft on the output side of the drive motor.

Thus, the eccentric, the reduction-gear mechanism, and the motor shaft can be mounted in the percussion mechanism housing in a simple manner. Furthermore, the manufacturing time required in each case can be reduced comparatively as only the percussion mechanism housing must be provided with the bearing points from one side.

Preferably, the trough-shaped percussion mechanism housing comprises a further bearing point for mounting the hammer tube, wherein the further bearing point is arranged perpendicular to the bearing points.

Thus, the hammer tube can be mounted in the trough-shaped percussion mechanism housing in an easy and straightforward manner.

An outer side of the percussion mechanism housing is preferably arranged at a first distance to the percussion axis and an outer side of a motor housing of the drive motor is arranged at a second distance to the percussion axis, wherein the first and second distance are diametrically opposite to each other and are at least approximately the same size.

Thus, a comparatively symmetrical arrangement of the eccentric and the drive motor to the percussion axis may be provided.

Preferably, an overall center of gravity of the hand-held power tool is arranged at least within predetermined tolerances on the percussion axis.

Thus, convenient and user-friendly operation of the hand-held power tool can be enabled.

The drive motor is preferably configured as an electronically commutated motor.

Thus, a compact drive motor can be easily provided.

In accordance with one embodiment, the hand-held power tool is configured as a drill hammer or chisel hammer.

Thus, an appropriate hand-held power tool may be provided in an easy and straightforward manner.

BRIEF DESCRIPTION OF THE DRAWINGS

The disclosure is explained in further detail in the following description with reference to exemplary embodiments shown in the drawings. The figures show.

DETAILED DESCRIPTION

Figure 1:
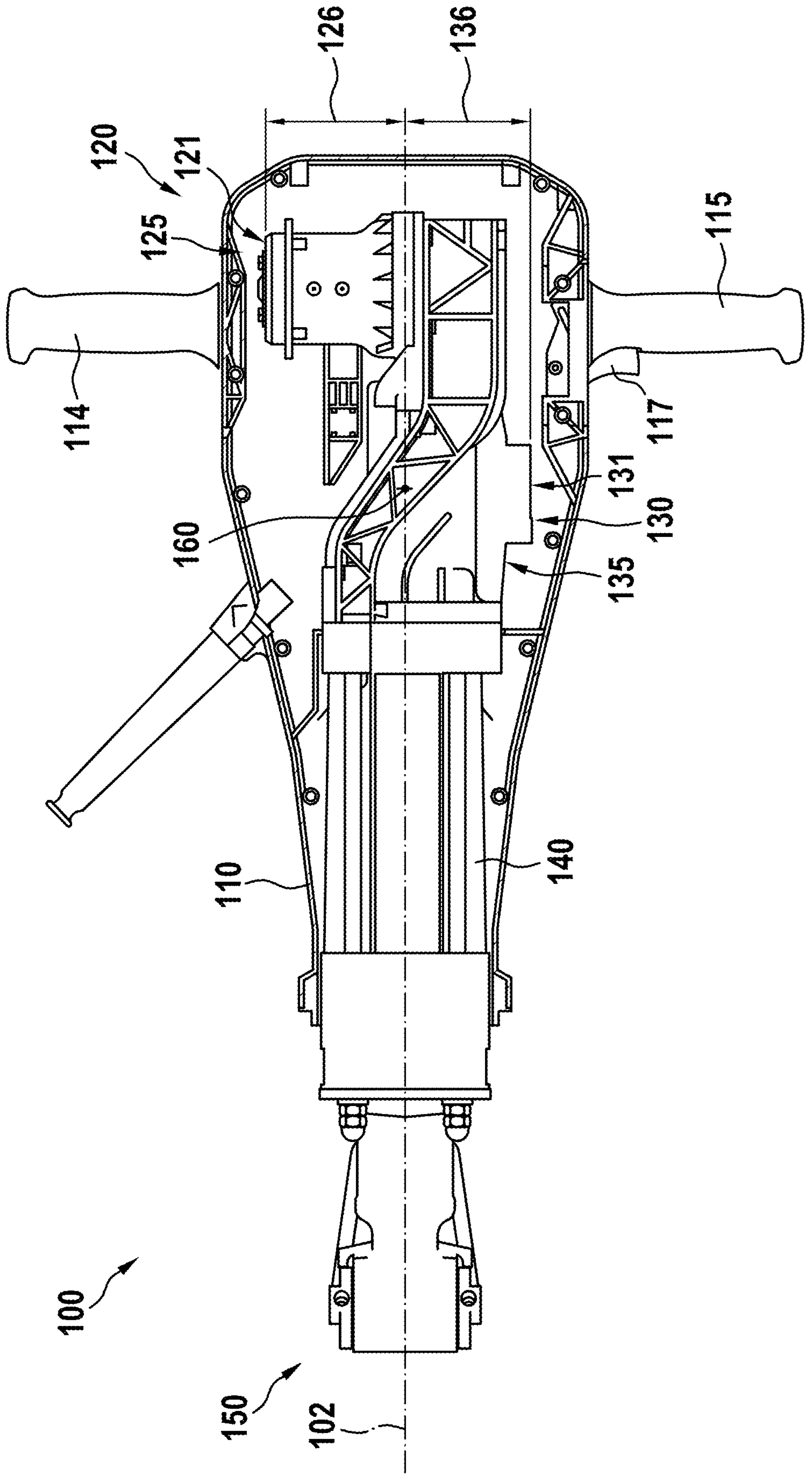
FIG. 1 a top view of a hand-held power tool with the housing open to illustrate an arrangement of a percussion mechanism housing and a motor housing, FIG. 2 a section through the percussion mechanism housing and the motor housing of FIG. 1, and FIG. 3 a top view of the percussion mechanism housing of FIG. 1 and FIG. 2.

Elements having the same or a comparable function are provided with the same reference characters in the drawings and are described in detail only once.

FIG. 1 shows an example of a hand-held power tool 100 comprising a housing 110, in which a drive unit 120 for driving a mechanical percussion mechanism 130 is arranged. The percussion mechanism 130 preferably comprises a percussion piston (255 in FIG. 2) which can be driven in a linearly oscillating manner, which is arranged in a hammer tube (265 in FIG. 2) arranged at least in sections in the housing 110, such that it can be displaced along an associated percussion axis 102.

Furthermore, at least one, illustratively two, handles 114, 115 are associated with the housing 110. Preferably, the two handles 114, 115 are arranged diametrically opposite on the housing 110. One of the two handles 114, 115, illustratively the handle 115, is associated by way of example with an operating element 117 for activating the drive motor 120.

Moreover, the hand-held power tool 110 preferably comprises a tool holder 150 for receiving an insertion tool, particularly a drill or chisel. Preferably, the hand-held power tool 100 is configured as a drill hammer or chisel hammer.

According to one embodiment, the drive motor 120 is configured as an electronically commutated motor. Furthermore, the drive motor 120 is illustratively arranged in a motor housing 125 and includes a stator 122. Analogously, the percussion mechanism 130 is arranged in a preferably trough-shaped percussion mechanism housing 135. A guide tube 140 is preferably associated with the percussion mechanism 130, in which a percussion piston (255 in FIG. 2) is guided linearly. The guide tube 140 is illustratively arranged between the percussion mechanism housing 135 and the tool holder 150.

Preferably, an outer side 131 of the percussion mechanism housing 135 is arranged at a first distance 136 to the percussion axis 102 and an outer side 121 of the motor housing 125 of the drive motor 120 is arranged at a second distance 126 to the percussion axis 102. Preferably, the first and second distances 126, 136 are arranged diametrically opposite to each other and are at least approximately the same size. The first distance 136 is formed illustratively downward from the percussion axis 102 and the second distance 126 is formed illustratively upward from the percussion axis 102.

Preferably, an overall center of gravity 160 of the hand-held power tool 100 is arranged at least within predetermined tolerances on the percussion axis 102. Here, the overall center of gravity 160 is preferably within a corresponding outer diameter of the hammer tube (265 in FIG. 2). For an exemplary outer diameter of the hammer tube (265 in FIG. 2) of 65 mm, the overall center of gravity 160 is preferably at a maximum distance of +/−32.5 mm perpendicular to the percussion axis 102. This results in a balanced center of gravity of the hand-held power tool 100 with a low grip distance, and/or distance of the handles 114, 115. The comparatively small grip distance of the handles 114, 115 facilitates manageability and loading for a user of the hand-held power tool 100. Likewise, possible major vibration generators, such as the percussion mechanism, the insertion tool, and the material to be processed, e.g., rock, are on a line with the overall center of gravity 160. Vibration and working motions are also predominantly along the percussion axis 102 so that tilting moments may at least be largely neglected. Moreover, efficient vibration reduction can be implemented simply, effectively, and inexpensively, e.g., via a decoupled outer housing. Furthermore, the location of the overall center of gravity 160 shown provides for improved and efficient transfer of percussion energy from the insertion tool, e.g., a chisel, into the rock to be processed or destroyed, as everything is configured in the direction of action. Moreover, the location of the overall center of gravity 160 shown can enable improved manageability, as the overall center of gravity 160 is virtually in line with the attachment point of the insertion tool, e.g., the chisel, resulting in a good and balanced support of the hand-held power tool 100 on the insertion tool.

Figure 2:
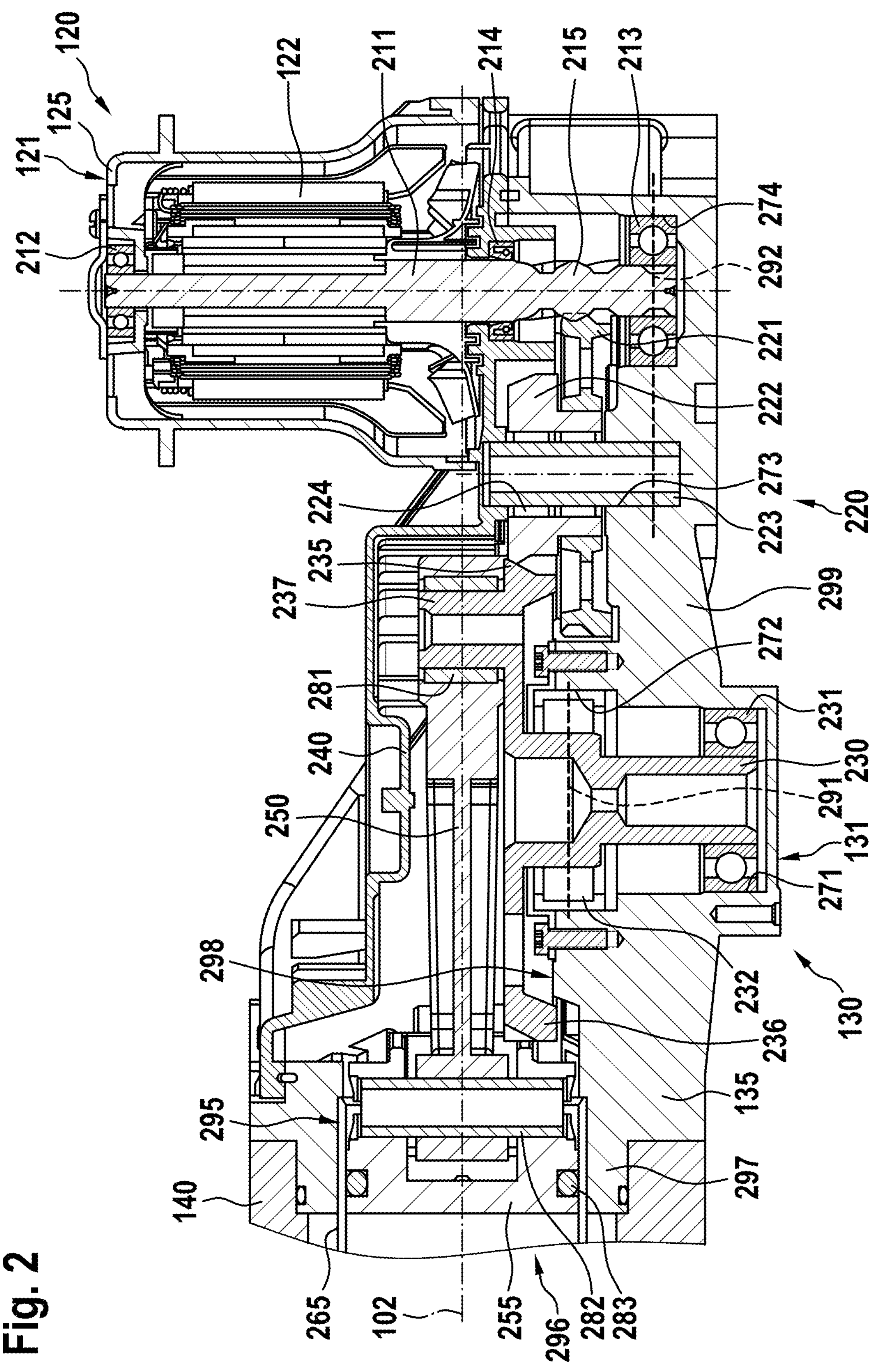

FIG. 2 shows the percussion mechanism 130 with the preferably trough-shaped percussion mechanism housing 135, the drive motor 120, and the guide tube 140 of FIG. 1. The percussion mechanism 130 preferably comprises a percussion piston 255 which can be driven in a linearly oscillating manner. Preferably, the percussion piston 255 is displaceably arranged in the guide tube 140 or a hammer tube 265 associated with the guide tube 140. Preferably, a damping ring 283 is associated with the percussion piston 255. The percussion piston 255 is preferably arranged in a hammer tube 265 arranged at least in sections in the housing 110, such that it can be displaced along an associated percussion axis 102, via a connecting rod 250. To do so, the connecting rod 250 is illustratively arranged about a bearing element 282 on the percussion piston 255. Furthermore, the percussion mechanism 130 is preferably associated with a gear configured to convert rotational movement of the drive motor 120 into a translational movement. Preferably, the gear is configured as an eccentric 230 to rotate the connecting rod 250, wherein the eccentric 230 is associated with the percussion mechanism 130. At its end opposite the percussion piston 255, the connecting rod 250 is mounted by way of example via a bearing element 281 on the eccentric 230 or an eccentric pin 237 associated with the eccentric 230. By rotating the eccentric 230, the connecting rod 250 moves the percussion piston 255 along the percussion axis 102. Furthermore, in the area of the eccentric 230, a cover 240 is illustratively provided, which is configured to close the percussion mechanism housing 135 in the area of the eccentric 230.

According to the disclosure, a reduction-gear mechanism 220, which can be driven by the drive motor 120, is arranged along the percussion axis 102 between the drive motor 120 and the eccentric 230 with a first spur gear 222. It is noted that the term "along the percussion axis 102" in the context of the present disclosure means movement in the direction of the percussion axis 102, wherein the movement does not have to occur on the percussion axis 102 but can also occur parallel to the percussion axis 102.

Preferably, the eccentric 230 is arranged on a second spur gear 236 with teeth 235. The first spur gear 222 meshes with the teeth 235 of the second spur gear 236. Here, the teeth 235 of the second spur gear 236 are preferably positioned perpendicular to the percussion axis 102 at least partially between the percussion axis 102 and a plane 291 arranged parallel to the percussion axis 102. Preferably, a bearing element 232 of the eccentric 230 is arranged in the plane 291 facing the percussion axis 102.

Preferably, the first spur gear 222 is positioned perpendicular to the percussion axis 102 between the percussion axis 102 and a plane 292 arranged parallel to the percussion axis 102. A bearing element 213 on the output side of a motor shaft 211 of the drive motor mover 120 is illustratively arranged in the plane 292.

Preferably, the eccentric 230 and the second spur gear 236 are integrally formed. Furthermore, the reduction-gear mechanism 220 is configured in two stages with a spur gear 221 and the spur gear 222. The two spur gears 221, 222 are preferably connected to each other, e.g., via a press connection. According to another embodiment, the two spur gears 221, 222 may also be integrally formed. The spur gear 221 is illustratively further from the percussion axis 102 than the spur gear 222 in a direction perpendicular to the percussion axis 102. Furthermore, the spur gear 221 preferably has a larger diameter than the spur gear 222. The motor shaft 211 has teeth 215 that preferably mesh with the spur gear 221.

Preferably, the trough-shaped percussion mechanism housing 135 comprises a first and second bearing point 271, 272 for mounting the eccentric 230, a third bearing point 273 for mounting the reduction-gear mechanism 220, and a fourth bearing point 274 for mounting the motor shaft 211 on the output side of the drive motor 120. Preferably, the trough-shaped percussion housing 135 has a bottom portion 299 to which the bearing points 271-274 are assigned. According to one embodiment, the trough-shaped percussion mechanism housing 135 comprises a retaining portion 297 arranged perpendicular to the percussion axis 102 for holding and positioning the guide tube 140 and/or the hammer tube 265. The retaining portion 297 comprises a bearing point 295 for mounting the percussion mechanism 130, in particular the hammer tube 265. The bearing point 295 is arranged perpendicular to the bearing points 271-274. Thus, machining of the percussion mechanism housing 135 is only required from a top side 298 of the percussion mechanism housing 135, or illustratively from the top, and optionally from a side 296, or illustratively from the left, which ensures accuracy, process reliability, and cost reduction. This eliminates the need to rotate and/or span the percussion mechanism housing 135 during manufacturing. Preferably, all bearing, cutting, and guide points that require high accuracy are located in the percussion mechanism housing 135, in particular in the bottom portion 299, such that the adjacent components, e.g., the cover 240, the guide tube 140, and the motor housing 125 preferably do not need to be reworked by machining. Preferably, the eccentric 230 is mounted in the bearing point 271 of the percussion mechanism housing 135 via an illustrative lower bearing element 231 and is mounted in the bearing point 272 of the percussion mechanism housing 135 via the upper bearing element 232. The bearing point 271 is preferably further from the percussion axis 102 than the bearing point 272 in a direction perpendicular to the percussion axis 102.

Preferably, the two spur gears 221, 222 are mounted via at least one, illustratively two, needle sleeves 224 on a bearing pin 223 in the percussion mechanism housing 135 or the bearing point 273. Furthermore, the cover 240 is preferably centered on the bearing pin 223.

The drive motor 120 is preferably mounted via the bearing element 213 in the bearing point 274 of the percussion mechanism housing 135. At its end opposite to the bearing point 274, or in the area of the outer side 121 of the motor housing 125, the drive motor 120 is illustratively mounted in the motor housing 125 via a bearing element 212 associated with the motor shaft 211. Moreover, a shaft sealing ring 214 is preferably associated with the drive motor 120. The shaft sealing ring 214 is illustratively arranged in a direction perpendicular to the percussion axis 102, or along the motor shaft 211, between the two bearing elements 212, 213. According to one embodiment, the shaft sealing ring 214 is configured as a radial shaft sealing ring.

The drive motor 120 and the eccentric 230 in the percussion mechanism housing 135 are preferably mounted from the top side 298, or illustratively from the top, and from the side 296, or illustratively from the left. The bearing bolt 223 and the illustratively lower bearing element 213 of the drive motor 120 are pressed into the percussion mechanism housing 135 in a pressing operation. The illustratively small and large spur gear 222, 221 of the reduction-gear mechanism 220 are mounted on the bearing pin 223 by means of the illustrative two needle sleeves 224. The complete eccentric assembly having the eccentric 230 and the illustrative upper and lower bearing elements 232, 231 are also inserted and fixed from illustratively above into the percussion mechanism housing 135. The teeth 235 of the spur gear 236 of the eccentric 230 then mesh with the small spur gear 222 of the reduction-gear mechanism 220. Subsequently, the pre-assembled gear box or percussion mechanism 130 is closed with the cover 240 from above and preferably screwed. The cover 240 preferably comprises a light and inexpensive material such as magnesium or plastic. The cover 240 preferably centers itself on the bearing pin 223 and preferably supports it, as described above. Furthermore, the cover 240 preferably receives the shaft sealing ring 214 precisely.

The connecting rod/piston assembly, consisting of the connecting rod 250 and the percussion piston 255, may be mounted onto the eccentric pin 237 from the side 296 or illustratively from the left. The remaining components of the percussion mechanism 130, such as the hammer tube 265 and the guide tube 140, are also connected illustratively from the left to the percussion mechanism housing 135. In order to complete the percussion mechanism assembly, the drive motor 120 is, in turn, preferably flanged to the percussion mechanism housing 135 illustratively from above. The motor shaft 211 is preferably inserted into the lower bearing element 213 through the shaft sealing ring 214, past the large spur gear 221. The fixed bearing seat of the motor shaft 211 lies within the illustrative upper bearing element 212 in the motor housing 125.

Figure 3:
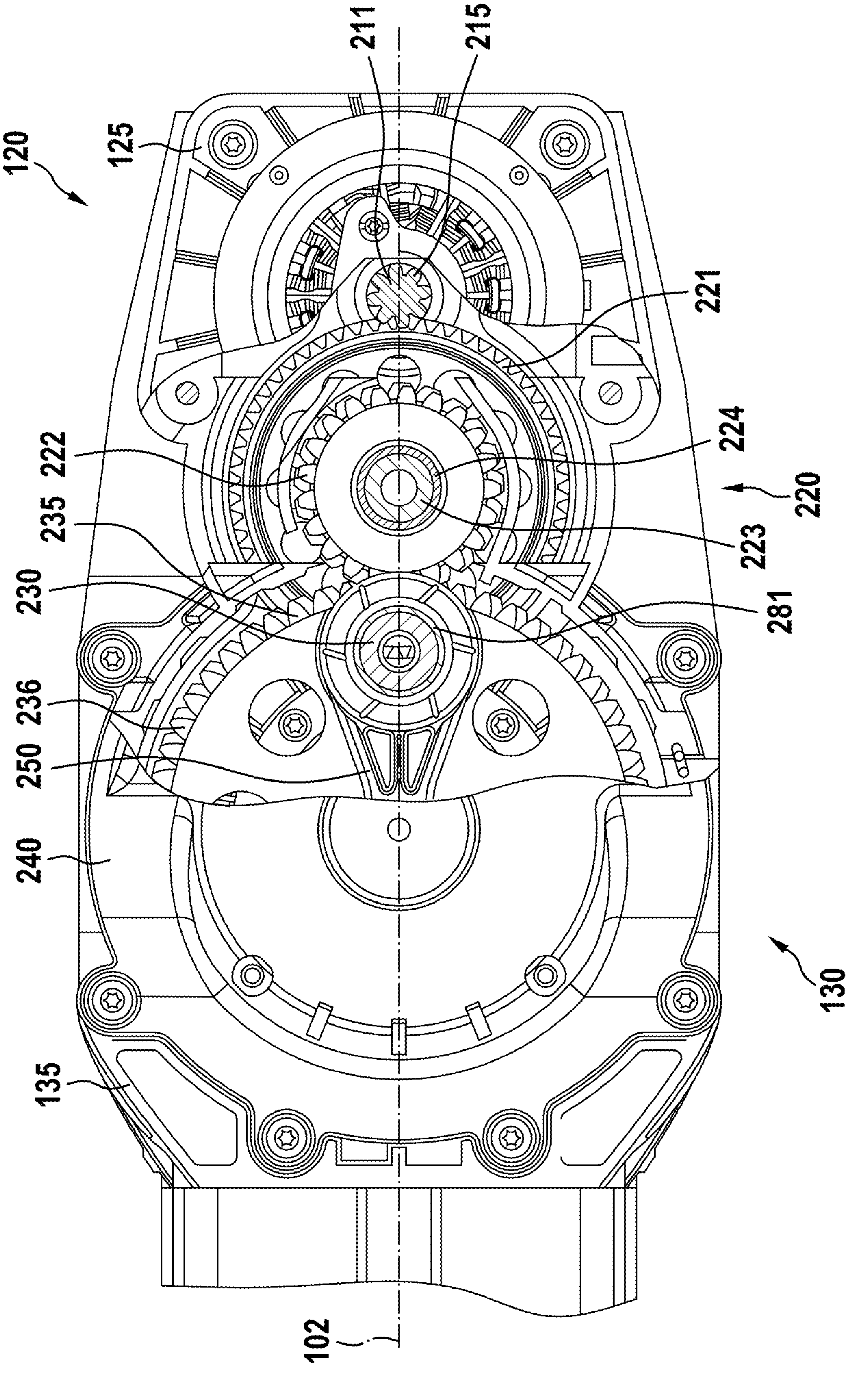

FIG. 3 shows the percussion mechanism housing 135 of FIG. 1 and FIG. 2 with the drive motor 120, the reduction-gear mechanism 220, and the eccentric 230. FIG. 3 illustrates the engagement of the motor shaft 211 with its teeth 215 with the spur gear 221 of the reduction-gear mechanism 220, as well as the engagement of the spur gear 222 of the reduction-gear mechanism 220 with the eccentric 230 or the spur gear 236 of the eccentric 230.

During assembly, the cover 240 is preferably first screwed to the percussion mechanism housing 135 with screws. Once the drive motor 120 has been inserted into the percussion mechanism housing 135 illustratively from above and centered, the drive motor 120 is also screwed to the percussion mechanism housing 135 using further screws. In this area, the cover 240 is pressed against the percussion mechanism housing 135 by the drive motor 120 and fixed in place.

Illustratively, the drive motor 120, the reduction-gear mechanism 220, and the eccentric 230 are located on the percussion axis 102. It is noted, however, that the drive motor 120, the reduction-gear mechanism 220, and/or the eccentric may also be arranged offset in parallel, i.e., illustratively displaced upwards and/or downwards relative to the percussion axis 102.

Preferably, the two distances 126, 136 are the same size. However, the second distance 126 is illustratively greater than the first distance 136. Here, the hand-held power tool 100 of FIG. 1 by way of example has a distance ratio of the first distance 136 to the second distance 126 of between 0.8 and 1.2.

The invention claimed is:

1. A hand-held power tool, comprising:
- a housing;
- a drive motor arranged in the housing;
- a mechanical percussion mechanism driven by the drive motor, the percussion mechanism comprising:
  - a hammer tube arranged at least partially in the housing;

a percussion piston arranged in the hammer tube; and a connecting rod via which the percussion piston is driven in a linear oscillating manner along a percussion axis;

an eccentric configured to drive the connecting rod;

a reduction-gear mechanism, which is arranged along the percussion axis between the drive motor and the eccentric and is configured to be driven by the drive motor, the reduction-gear mechanism comprising a first spur gear; and a second spur gear on which the eccentric is arranged, the second spur gear having teeth with which the first spur gear meshes, at least a portion of the teeth of the second spur gear being positioned, in a direction perpendicular to the percussion axis, between the percussion axis and a first plane defined parallel to the percussion axis, wherein:

the eccentric is mounted at a first position nearer the percussion axis and a second position further from the percussion axis, and the eccentric is mounted at the first position by a first bearing element that is arranged in the first plane;

the first spur gear is positioned, in the direction perpendicular to the percussion axis, between the percussion axis and a second plane defined parallel to the percussion axis;

a second bearing element on an output side of a motor shaft of the drive motor is arranged in the second plane; and the drive motor is arranged on a side of the percussion axis opposite the first plane.

2. The hand-held power tool according to claim 1, wherein the eccentric and the second spur gear are integrally formed.

3. The hand-held power tool according to claim 2, wherein the reduction-gear mechanism comprises the first spur gear and a third spur gear that are connected to each other or are integrally formed.

4. The hand-held power tool according to claim 1, wherein:

the percussion mechanism has a trough-shaped percussion mechanism housing having a bottom portion; and the bottom portion comprises a first bearing point for the first bearing element, a second bearing point for mounting the eccentric at the second position, a third bearing point for mounting the reduction-gear mechanism, and a fourth bearing point for mounting the output side of the motor shaft.

5. The hand-held power tool of claim 4, wherein:

the trough-shaped percussion mechanism housing comprises a fifth bearing point for mounting the hammer tube; and the fifth bearing point is oriented perpendicular to the first bearing point, the second bearing point, the third bearing point, and the fourth bearing point.

6. The hand-held power tool according to claim 4, wherein:

an outer side of the percussion mechanism housing is arranged at a first distance to the percussion axis;

an outer side of a motor housing of the drive motor is arranged at a second distance to the percussion axis; and the first distance and the second distance are diametrically opposite to each other.

7. The hand-held power tool according to claim 1, wherein an overall center of gravity of the hand-held power tool is arranged at least within predetermined tolerances on the percussion axis.

8. The hand-held power tool according to claim 1, wherein the drive motor is configured as an electronically commutated motor.

9. The hand-held power tool according to claim 1, wherein the hand-held power tool is configured as a drill hammer or a chisel hammer.

10. The hand-held power tool according to claim 1, wherein the first plane is arranged, in the direction perpendicular to the percussion axis, between the second plane and the percussion axis.

11. The hand-held power tool according to claim 1, wherein a stator of the drive motor is arranged entirely on the side of the percussion axis opposite the first plane.

12. The hand-held power tool according to claim 1, wherein the eccentric includes an eccentric pin that interfaces with the connecting rod, the eccentric pin being arranged on the percussion axis.

* * * * *